Dec. 28, 1954     A. MAGNANI     2,698,097

APPARATUS FOR HANDLING SHEETS

Filed Jan. 7, 1949     2 Sheets-Sheet 1

INVENTOR.
Alessandro Magnani
BY
Pennie Edmonds Morton & Barrows
ATTORNEYS

Dec. 28, 1954    A. MAGNANI    2,698,097
APPARATUS FOR HANDLING SHEETS
Filed Jan. 7, 1949    2 Sheets-Sheet 2

INVENTOR
Alessandro Magnani
BY
Pennie Edmonds Morton Barrows Taylor
ATTORNEYS

# United States Patent Office

2,698,097
APPARATUS FOR HANDLING SHEETS

Alessandro Magnani, Broni, Italy, assignor to F. L. Smidth & Co. A/S, Copenhagen, Denmark, a corporation of Denmark Application January 7, 1949, Serial No. 69,809

Claims priority, application Italy January 14, 1948

7 Claims. (Cl. 214—1)

This invention relates to apparatus for handling sheets of fibrous cement and like material cut from a web in soft plastic condition delivered from a continuous forming machine. More particularly, the invention is concerned with a novel apparatus for handling soft plastic sheets, for example, in the course of stacking them to permit them to age and harden, the new apparatus making possible the rapid handling of the sheets without damage thereto. The apparatus of the invention resembles that disclosed in my Patent No. 2,538,972, issued January 23, 1951, but is superior thereto in numerous respects, which will be apparent from the detailed description to follow.

The apparatus of the patent includes a stationary table, over which the web from the forming machine passes to be trimmed and cut into sheets in its travel. From the stationary table, the sheets pass to a rotatable table, by which the sheets are delivered to carriages to be conveyed to the place where they are stored and aged. In order to facilitate the movement of the sheets over the surfaces of the tables, the table tops are made hollow and their upper surfaces are formed with a plurality of small holes, through which air under pressure is discharged to create an air film between the table surfaces and the lower face of a sheet passing thereover. In such apparatus, the pressure and quantity of air discharged through the openings in the table tops must be kept relatively low in order to avoid bulging the somewhat plastic sheets upwardly and thereby impairing their strength. Because of the small amount of air at low pressure that must be used, it is necessary to incline the table tops downwardly at a relatively steep angle in order to cause the sheets to move automatically thereover, and such inclination of the table tops may not always be conveniently used in practice.

In the apparatus of the invention, the sheets cut from the web issuing from the forming machine pass over a table, the top of which is formed with a plurality of perforated areas separated by openings. Air is supplied to the table top from beneath to be discharged through the perforations, and the air forms a layer on which the sheets are supported. Any excess air escapes through the openings and thus the air pressure beneath the sheets is uniform and there is no accumulation of air tending to bulge the sheets upwardly.

The sheets are removed from the table by a carriage provided with a plurality of hollow elements, which can be connected to a source of sub-atmospheric pressure. The carriage is movable both horizontally and vertically and, when a sheet on the table is to be transferred therefrom, the carriage is moved over the table and then lowered until the suction elements make contact with the sheet. With the sheet held in place against the elements by the suction, the carriage is raised to lift the sheet and then moved horizontally to the place where the sheets are to be stacked and aged. Upon release of the suction, the sheets are freed from the carriage.

For a better understanding of the invention, reference may be made to the accompanying drawing, in which Fig. 1 is a view, partly in side elevation and partly in section, of one form of the apparatus suitable for the handling of longitudinally corrugated sheets;

Figure 1:
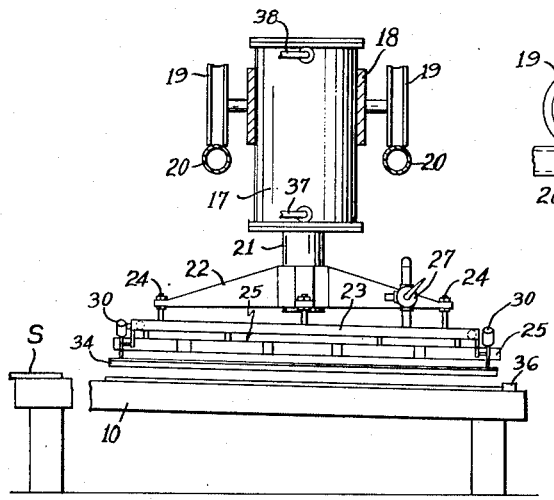
Figure 2:
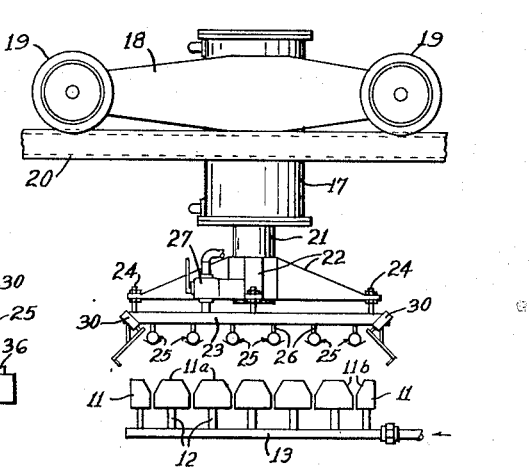
Fig. 2 is a partial end view of the apparatus.

The sheets S cut from the web issuing from the continuous forming machine are passed to a table 10, the top of which is formed of a plurality of longitudinally extending chambers 11 having top surfaces which include flat portions 11a and inclined portions 11b. Each outer chamber in the group has a single inclined surface, while the central chambers have a pair of inclined surfaces convergent upwardly. The chambers are connected by pipes 12 to a manifold 13 supplied with air under pressure from a suitable source. The surfaces 11a of the chambers are imperforate, while the inclined surfaces 11b are formed with a multiplicity of perforations 14. Adjacent chambers are separated to form air discharge openings or passages 15 which extend the entire length of the table.

During the operation of the apparatus, air supplied to the chambers through pipes 12 and manifold 13, is discharged through the perforations 14 and the corrugated sheet S is fed to the table with its valleys 16 lying above openings 15. The portions of the sheet diverging upwardly from the bottom of each valley then lie close to the perforated inclined surfaces of the chambers, and the sheet is supported by a layer of air between it and the perforated surfaces.

The sheet is transferred from the table by means including a vertical cylinder 17 mounted on a truck formed of frame members 18 and provided with wheels 19 running on rails 20 mounted transversely above table 10. Within the cylinder is a piston provided with a rod 21 supporting a carriage at its lower end, the carriage including a frame member 22 beneath which is mounted a hollow manifold frame 23 on bolts 24, which can be adjusted to level the frame. A plurality of longitudinally extending tubes 25 are attached to pipes 26 leading from the manifold, and the manifold can be connected through a three-way valve 27 to a source of sub-atmospheric pressure or to the atmosphere.

The tubes 25 are spaced a distance equal to the distance between the bottoms of the valleys in the corrugated sheet and the lower portion of each tube is formed with perforations 28. Each tube is also provided with a pair of wings 29 of flexible impervious material, such as rubber, the wings extending laterally from the tube on opposite sides of the perforated section thereof.

A cylinder 30 is mounted on the manifold frame near each corner thereof and each cylinder contains a piston with a rod 31 engaging one end of a lever 32 pivoted on a hanger 33 attached to the frame. The levers at opposite ends of one side of the frame are connected by a blade 34, and the cylinders 30 are provided at opposite ends with air connections 35, by which the air may be supplied to move the pistons therein.

Figure 3:
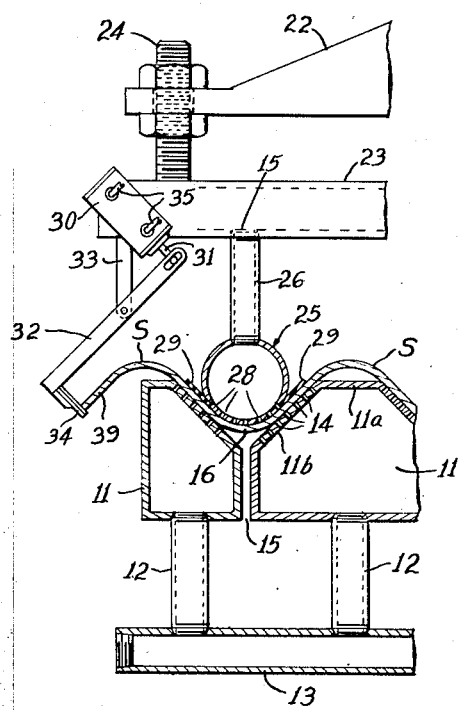
Fig. 3 is a fragmentary view on an enlarged scale and partly in vertical section and partly in elevation, of details of the apparatus.
Figure 4:
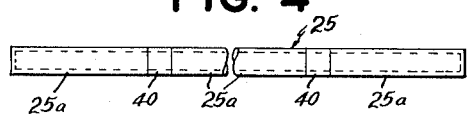
Figs. 4 and 5 are elevational and fragmentary sectional views of one of the suction elements on the carriage.

In the operation of the apparatus, the sheet S in soft plastic condition is fed upon table 10, the top surface of which is inclined downwardly at a slight angle. The air issuing through the perforations 14 in the inclined top surfaces 11b of chambers 11 forms a cushion beneath the sheet and the sheet slides downwardly along the table on the air layer, until it comes to rest against a stop rail 36. During the movement of the sheet along the top of the table, no air can accumulate beneath the sheet and deform it, since excess air escapes through the longitudinal passages 15 between chambers 11. While the sheet is moving along the table, the carriage has been raised by air supplied to the lower end of cylinder 17 beneath the piston through an inlet 37. When the sheet has come to rest against the stop rail, the truck is moved along rails 20, until the carriage is properly centered relative to the sheet, and air is then supplied to cylinder 17 through connection 38 above the piston to lower the carriage. When the tubes 25 have come into contact with the sheet, as shown in Fig. 3, the manifold 14 is connected through valve 27 to a source of reduced pressure and the suction causes the sheet to adhere to the tubes. Entrance of air over the top of the sheet into the perforations 28 in tubes 25 is prevented by the wings 29, which contact with the sheet. If the sheet has end portions 39, which project outwardly beyond the outer chambers 11, air is admitted into cylinders 30 to swing levers 32, until the blades 34 carried thereby lie beneath the edges of the sheet. Air is now supplied to cylinder 17 beneath the piston to raise the carriage and the sheet is lifted from table by suction applied to it through tubes 25. When the sheet has cleared the table, the truck 18 is moved along rails 20 to the place where the sheet is discharged. The carriage is then lowered to place the sheet on the receiving surface, valve 27 is turned to disconnect the manifold frame 23 from the suction and open it to the atmosphere, and air is admitted into cylinders 30 to retract the levers 32 and free the blades 34 from the edges of the sheet. The carriage is then raised and the truck returned to a position above the table.

The suction elements 25 are preferably made of a number of sections 25a connected end to end by flexible sleeves 40. The elements may then adjust themselves to make contact with a sheet, the top surface of which is somewhat irregular.

Figure 6:
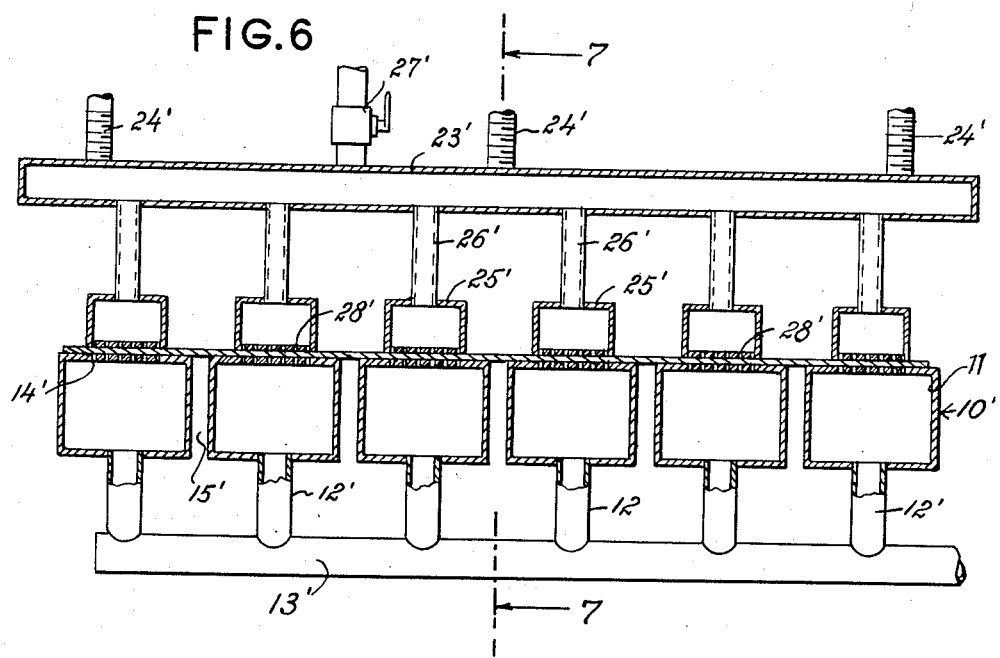
Fig. 6 is a fragmentary transverse vertical sectional view of a form of apparatus for handling flat sheets.
Figure 7:
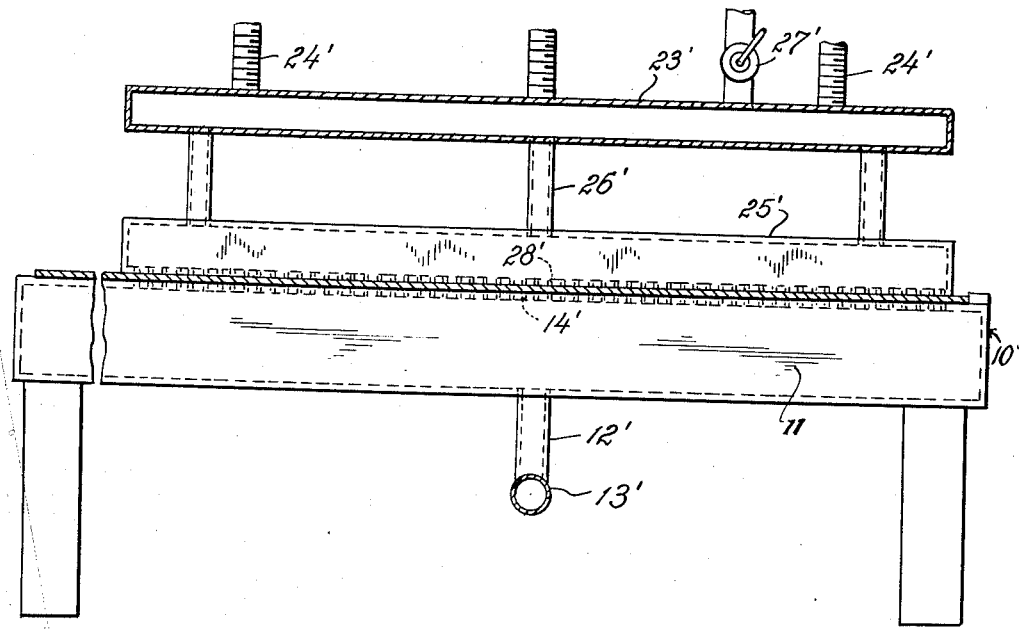
Fig. 7 is a sectional view on the line 7—7 of Fig. 6.

The apparatus for handling flat sheets shown in Figs. 6 and 7 comprises a table 10' made up of a plurality of spaced chambers 11', the tops of which lie in a plane and form the top supporting surface of the table. The tops of the chambers are formed with perforations 14' for discharge of air and the chambers are spaced from one another to provide excess air discharge passages 15'. The chambers are connected by pipes 12' to a manifold 13' supplied with air under pressure.

Figure 5:
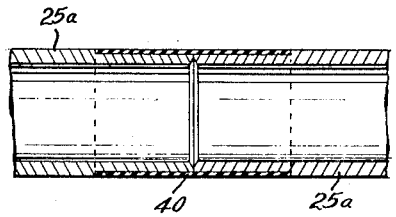

The sheet transfer means comprises a carriage similar to that shown in Fig. 1 and a hollow manifold frame 23' is attached to the carriage by bolts 24'. The suction elements are longitudinally extending tubes 25' attached to pipes 26' connected to the frame 23', which is connectable through valve 27' either to a source of sub-atmospheric pressure or to the atmosphere. The tubes 25' have bottom surfaces with perforations 28' and the bottom surfaces are flat, so that they will make good contact with the top of the sheet. As in the construction shown in Figs. 1 and 5, the tubes 25' may be made up of sections connected end to end by flexible sleeves.

I claim:

1. In apparatus for handling fibrous cement sheets in plastic condition, the combination of a table having a top formed of a plurality of hollow chambers extending lengthwise of the top side by side and spaced apart to form passages extending from end to end of the table, each chamber having spaced upwardly convergent planar side walls formed with a multiplicity of perforations, and means for supplying air to the chambers to escape through the perforations and float a sheet above the chambers, excess air beneath the sheet escaping through the passages.

2. Apparatus for handling fibrous cement sheets in plastic condition, which comprises a table having a top surface formed with a plurality of areas containing small perforations, the areas being separated by passages, means for supplying air under pressure to said areas from beneath to escape through the perforations, a carriage movable horizontally over the table and vertically toward and from the table, means for raising and lowering the carriage, a plurality of hollow longitudinally extending elements depending from the carriage in spaced relation and having perforated lower surfaces adapted to engage a sheet supported on the air layer formed by air issuing from the perforations in the top surface of the table, a pair of flexible impervious wings mounted on each element to extend laterally from the perforated surface thereof, and means for maintaining a sub-atmospheric pressure within the hollow elements.

3. Apparatus for handling fibrous cement sheets in plastic condition, which comprises a table having a top surface formed with a plurality of areas containing small perforations, the areas being separated by passages, means for supplying air under pressure to said areas from beneath to escape through the perforations, a carriage movable horizontally over the table and vertically toward and from the table, means for raising and lowering the carriage, a plurality of hollow elements depending from the carriage and having perforated lower surfaces adapted to engage a sheet supported on the air layer formed by air issuing from the perforations in the top surface of the table, a pair of members mounted at the sides of the carriage and operable to engage and support the side edges of said sheet, and means for maintaining a sub-atmospheric pressure within the hollow elements.

4. Apparatus for handling fibrous cement sheets in plastic condition, which comprises a table having a top surface formed with a plurality of areas containing small perforations, the areas being separated by passages, means for supplying air under pressure to said areas from beneath to escape through the perforations, a carriage movable horizontally over the table and vertically toward and from the table, means for raising and lowering the carriage, a plurality of hollow elements depending from the carriage and having perforated lower surfaces adapted to engage a sheet supported on the air layer formed by air issuing from the perforations in the top surface of the table, a pair of members mounted at the sides of the carriage for swinging movement and operable to engage and support the side edges of said sheet, and means for maintaining a sub-atmospheric pressure within the hollow elements.

5. Apparatus for handling corrugated fibrous cement sheets in plastic condition, which comprises a table having a top formed of a plurality of hollow chambers extending lengthwise of the top side by side and spaced apart to form passages between them, each chamber having spaced upwardly convergent side walls formed with a multiplicity of perforations, means for supplying air under pressure to the chambers to escape upwardly through the perforations and float a sheet above the table top with the valleys in the sheet lying above the passages, a carriage movable horizontally over the table and vertically toward and from the table, means for raising and lowering the carriage, and a plurality of tubular elements depending from the carriage and extending lengthwise thereof, the elements being spaced and adapted to enter the valleys in the sheet when the carriage is lowered, the elements having perforated lower surfaces and laterally extending flexible impervious wings adapted to engage the sheet, and means for maintaining a sub-atmospheric pressure within the elements.

6. In apparatus for handling fibrous cement sheets in plastic condition, the combination of a table having an upper surface formed with a plurality of pairs of downwardly convergent planar areas extending longitudinally of the table and containing small perforations, the areas of each pair being separated by a passage extending lengthwise of the table, and means for supplying air beneath the top of the table to escape upwardly through the perforations and float a sheet above the table top, excess air escaping from beneath the sheet through the passages.

7. In apparatus for handling fibrous cement sheets in plastic condition, the combination of a table having an upper surface formed with a plurality of pairs of downwardly convergent planar areas extending longitudinally of the table and containing small perforations, the areas of each pair being separated by a passage extending lengthwise of the table, means for supplying air beneath the top of the table to escape upwardly through the perforations and float a sheet above the table top, excess air escaping from beneath the sheet through the passages, and means for removing sheets successively from the table, said means including a plurality of hollow suction elements extending lengthwise of the table in line with the passages separating the convergent surfaces of each pair, each suction element having perforations in the lower part of its surface adapted to engage the upper portions of a sheet in contact with a pair of said surfaces.

References Cited in the file of this patent

UNITED STATES PATENTS

| Number | Name | Date |
|---|---|---|
| 756,600 | Dodge | Apr. 5, 1904 |
| 1,057,183 | Steele | Mar. 25, 1913 |
| 1,228,690 | Monnet | June 5, 1917 |
| 1,756,614 | Wiener | Apr. 29, 1930 |
| 2,176,307 | Lamb et al. | Oct. 17, 1939 |
| 2,678,237 | Allander | May 11, 1954 |

FOREIGN PATENTS

| Number | Country | Date |
|---|---|---|
| 119,979 | Great Britain | Oct. 24, 1918 |